United States Patent
Ahn

(10) Patent No.: US 7,818,016 B2
(45) Date of Patent: Oct. 19, 2010

(54) METHOD AND SYSTEM FOR PROVIDING A LOCATION-BASED ALERT SERVICE IN WIRELESS COMMUNICATION ENVIRONMENT

(75) Inventor: Byungik Ahn, Seongnam-si (KR)

(73) Assignee: Point-1 Co., Ltd., Gangnam-gu, Seoul (KR)

( * ) Notice: Subject to any disclaimer, the term of this patent is extended or adjusted under 35 U.S.C. 154(b) by 1006 days.

(21) Appl. No.: 11/309,693

(22) Filed: Sep. 13, 2006

(65) Prior Publication Data

US 2007/0298757 A1  Dec. 27, 2007

(30) Foreign Application Priority Data

Jun. 27, 2006  (KR) ..................... 10-2006-0058320

(51) Int. Cl.
- *H04W 24/00* (2009.01)
- *H04M 11/04* (2006.01)
- *H04M 3/493* (2006.01)

(52) U.S. Cl. .............. 455/456.1; 455/456.3; 455/404.2; 455/414.2

(58) Field of Classification Search .............. 455/404.2, 455/414.2, 456.1, 456.3; 370/935, 936, 938; 701/23, 25, 201, 204, 225

See application file for complete search history.

(56) References Cited

U.S. PATENT DOCUMENTS

| | | | |
|---|---|---|---|
| 6,308,177 B1 * | 10/2001 | Israni et al. ................. | 701/208 |
| 7,072,666 B1 * | 7/2006 | Kullman et al. .......... | 455/456.1 |
| 7,149,504 B1 * | 12/2006 | Weaver et al. ............ | 455/414.2 |
| 2005/0043037 A1 * | 2/2005 | Ioppe et al. ............... | 455/456.1 |
| 2005/0101333 A1 * | 5/2005 | Raith ....................... | 455/456.1 |

* cited by examiner

*Primary Examiner*—Dwayne D Bost
*Assistant Examiner*—Michael Mapa
(74) *Attorney, Agent, or Firm*—Lahive & Cockfield, LLP; EuiHoon Lee, Esq.

(57) ABSTRACT

Disclosed is a method and a system for providing a location-based alert service in a wireless communication environment, wherein, in a case where a specific user is located in a certain zone using a mobile communication terminal and a mobile communication network, the number of location inquiries is minimized using a moving distance ratio, a moving direction and a Minimum Bounding Rectangle (MBR) in providing the a location-based alert service for informing that the specific user is located in a certain zone.

21 Claims, 14 Drawing Sheets

(a)

(b)

(a)

(b)

(a)

METHOD AND SYSTEM FOR PROVIDING A LOCATION-BASED ALERT SERVICE IN WIRELESS COMMUNICATION ENVIRONMENT

CROSS REFERENCE TO RELATED APPLICATIONS

This application claims priority for Application 2006-0058320 filed on Jun. 27, 2006 in the Republic of Korea.

FIELD OF THE INVENTION

The present invention relates to a method and a system for providing a location-based alert service in a wireless communication environment, and more particularly to a method and a system for providing a location-based alert service in a wireless communication environment, wherein, in a case where a specific user is located in a certain zone using a mobile communication terminal and a mobile communication network, the number of location inquiries is minimized using a moving distance ratio, a moving direction and a Minimum Bounding Rectangle (MBR) in providing the a location-based alert service for informing that the specific user is located in a certain zone.

BACKGROUND OF THE INVENTION

Recently, techniques for building various kinds of user service circumstances using the Internet have been serviced with the development of communication and network technologies.

A location inquiry technique provides services for inquiring about location information of a user and other users, in which a user's own location information or the counterpart's location information can be inquired using a mobile communication terminal not only in wired Internet circumstances but also in wireless internet environment. That is, a user's own location information or the like can be inquired, and another user's location information can be retrieved and identified in the wired and wireless Internet environment.

Especially, "a location-based alert service" is a service in which, if a previously specified counterpart moves forward or away from a user, a corresponding movement is informed through short message or the like.

FIG. 1 is a block diagram showing a configuration of a conventional location-based service system.

A conventional system for providing conventional location-based service includes a mobile client group 101 having a plurality of mobile clients, a client group 102 having a plurality of clients, a base station 103, a mobile switching center 104, a location processing server 105, a map server 106, a map DB 107, an SMS server 108, the Internet 109, a web server 110, a location service server 111 and a location inquiry mutual authentication DB 112.

Each of the mobile clients in the mobile client group 101 is a mobile communication means, i.e., a wireless portable terminal (e.g., a cellular phone, a PCS, a PDA, an IMT-2000 or the like), which is connectable to the Internet 109 through a mobile switching center 104 or the like. Each of the mobile clients may be connected to the location service server 111 through the Internet 109 and the web server 110 to receive location based services provided using the Internet 109. Further, the mobile client may be linked with the location service server 111 through the base station 103, the mobile switching center 104 or the like to use location information services with the wireless portable terminal through the SMS server 108.

Each of the clients in the client group 102 is a system connectable to the Internet 109 using a modem, e.g., an dedicated line, an ADSL or the like. Like each of the mobile clients in the mobile client group 101, each of the clients may be connected to the location service server 111 through the Internet 109 and the web server 110 in order to receive location based services provided using the Internet 109.

The base station 103 provides communication services between a mobile client within its own coverage (i.e., a cell) and the mobile switching center 104. The mobile switching center 104 includes base station controllers which oversee a plurality of base stations, a WAP gateway, a Home Location Register (HLR), a Visitor Location Register (VLR) and the like. The mobile switching center 104 provides various communication services performed between each of the mobile clients within the coverage of each base station which is under the control of the mobile switching center 104 and a counterpart (or a mobile client), manages a local registration state of the mobile clients within the coverage of each base station which is under the control of the mobile switching center 104, and connects itself to the Internet 109 through the WAP gateway to provide location information services to each of the mobile clients.

Further, when there is a location detection request for a specific mobile client (i.e., a client that is a location information object of the location inquiry services) from the location processing server 105 in the mobile switching center 104, it refers to the Home Location Register (HLR) and the Visitor Location Register (VLR) and searches a base station which currently covers and serves the mobile client of interest. If a base station within which the corresponding mobile client exists is founded, the mobile switching center 104 provides the location value of the corresponding base station for the location processing server 105. Furthermore, if the specific mobile client, which is an object of which location is inquired, is a terminal having a GPS module therein, the mobile client receives location information from a GPS satellites to provide the location value of the calculated result of the location information for the location processing server 105.

The web server 110 provides location information services to each of the clients or each of the mobile clients. When a client or a mobile client connect itself to the Internet 109 to request the location information services, the web server 110 links between the corresponding client (or the mobile client) and the location service server 111 to provide the location information services corresponding thereto through various kinds of menu screens (e.g., an initial menu screen, a location information menu screen and the like).

Further, the location service server 111 registers and manages information related virtually to location information services put in or selected by a user, such as a location, a location permission or the like, which is requested by each of the users (i.e., the client or the mobile client). The location service server 111 stores/registers the result of mutual authentication for the location information services in the location inquiry mutual authentication DB 112 to manage it.

If address and/or mutual information are entered together with a location data request signal from the location service server 111 when the location based services are provided, the map server 106 searches the map DB 107 in which electronic map data is built and stored in order to detect a location value (i.e., a coordinate value) for a requested address and/or mutual information on an electronic map, and to transmit the detected coordinate value as location data to the location service server 111. If the location value (i.e., the coordination value) is input together with the map data request signal from the location service server 111 when the location based services are provided, the map server 106 fetches a map data corresponding to the received location value from the map DB 107 to transmit it to the location service server 111.

Further, if a mobile client selects its own current location as a registration location when the location information service is provided, the map server 106 transmits identification information on the corresponding mobile client together with a location data request signal, e.g. identification information on the corresponding mobile client together with a corresponding location search request signal, from the location service server 111. If the location value (i.e., the longitude and latitude coordinate values) of a base station in which the corresponding mobile client is served is provided from the location service server 111 through the location processing server 105 in response to the identification information on the corresponding mobile client, the map server 106 searches and reads coordinate value corresponding to the location value of the corresponding base station from the map DB 107 so as to transmit it to the location service server 111.

A method generally considered to provide a conventional location-based alert service is to periodically inquire the location of a mobile communication terminal. For example, assuming that a location inquiry of the mobile communication terminal is performed every 10 minutes, location inquiries are performed 144(=60/10*24) times in 24 hours. If the number of object mobile communication terminals on which location inquiries should be performed is a million, total location inquiries are performed 144 million(=144*one million) times in 24 hours. There is a disadvantage in that such enormous volume of the location inquiries in 24 hours causes a considerable load to a mobile communication network and, as a result, exacts unnecessary excessive costs for performing a location-based alert service.

BRIEF SUMMARY OF THE INVENTION

Accordingly, the present invention has been made to solve the above-mentioned problems occurring in the prior art, and it is an object of the present invention to provide a method and a system for providing a location-based alert service in a wireless communication environment, wherein, in a case where a specific user is located in a certain zone using a mobile communication terminal and a mobile communication network, the number of location inquiries is minimized using a moving distance ratio, a moving direction and a Minimum Bounding Rectangle (MBR) in providing the a location-based alert service for informing that the specific user is located in a certain zone.

According to an aspect of the present invention, there is provided a system for providing a location-based alert service to generate an alert upon monitoring a location of a mobile client relative to an alert zone, comprising: a client for inputting a location alert generation condition for using the location-based alert services; a location-based alert server for receiving location information on the mobile client to minimize the number of location inquiries using a moving distance ratio and a moving direction of the mobile client; a location information DB for receiving and storing the location information on the mobile client from the location-based alert server; and a location alert service server for receiving and storing the location alert generation condition from the client, and determining whether the mobile client exists in an alert range set by the client by receiving a location data of the mobile client from the location-based alert server to thereby generate an alert.

In accordance with another aspect of the present invention, there is provided a system for providing a location-based alert service to generate an alert upon monitoring a location of a mobile client relative to an alert zone, comprising: a client for inputting a location alert generation condition for using the location-based alert service; a location-based alert server for receiving location information on the mobile client to minimize the number of location inquiries using an increase/decrease ratio of areas between a Minimum Bounding Rectangle (hereinafter, referred to as "MBR") for a current moving location of the mobile client and the MBR up to the location of the mobile client, which has been obtained at a previous time; a location information DB for receiving and storing the location information on the mobile client from the location-based alert server; and a location alert service server for receiving and storing the location alert generation condition from the client, and determining whether the mobile client exists in an alert range set by the client by receiving a location data of the mobile client from the location-based alert server to thereby generate an alert.

In accordance with another aspect of the present invention, there is provided a method for providing a location-based alert service, wherein the number of location inquiries is minimized in a case where a mobile client enters an alert zone, comprising the steps of: (a) calculating a moving distance ratio of the mobile client; (b) adjusting a location inquiry request time interval by using a current moving distance of the mobile client, lower and upper limit values of the current moving distance, and the moving distance ratio; (c) adjusting the location inquiry request time interval by using a current and previous distances of the mobile client and the alert zone; and (d) setting the location inquiry request time interval as an initial location inquiry time interval if the mobile client enters a buffer zone.

In accordance with another aspect of the present invention, there is provided a method for providing a location-based alert service, wherein the number of location inquiries is minimized in a case where a mobile client leaves from an alert zone to an external zone, comprising the steps of: (a) calculating a moving distance ratio of the mobile client; (b) adjusting a location inquiry request time interval by using a current moving distance of the mobile client, lower and upper limit values of the current moving distance, and the moving distance ratio; (c) adjusting the location inquiry request time interval using the current and previous distances of the mobile client and the alert zone; and (d) setting the location inquiry request time interval as an initial location inquiry time interval if the mobile client enters a buffer zone.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
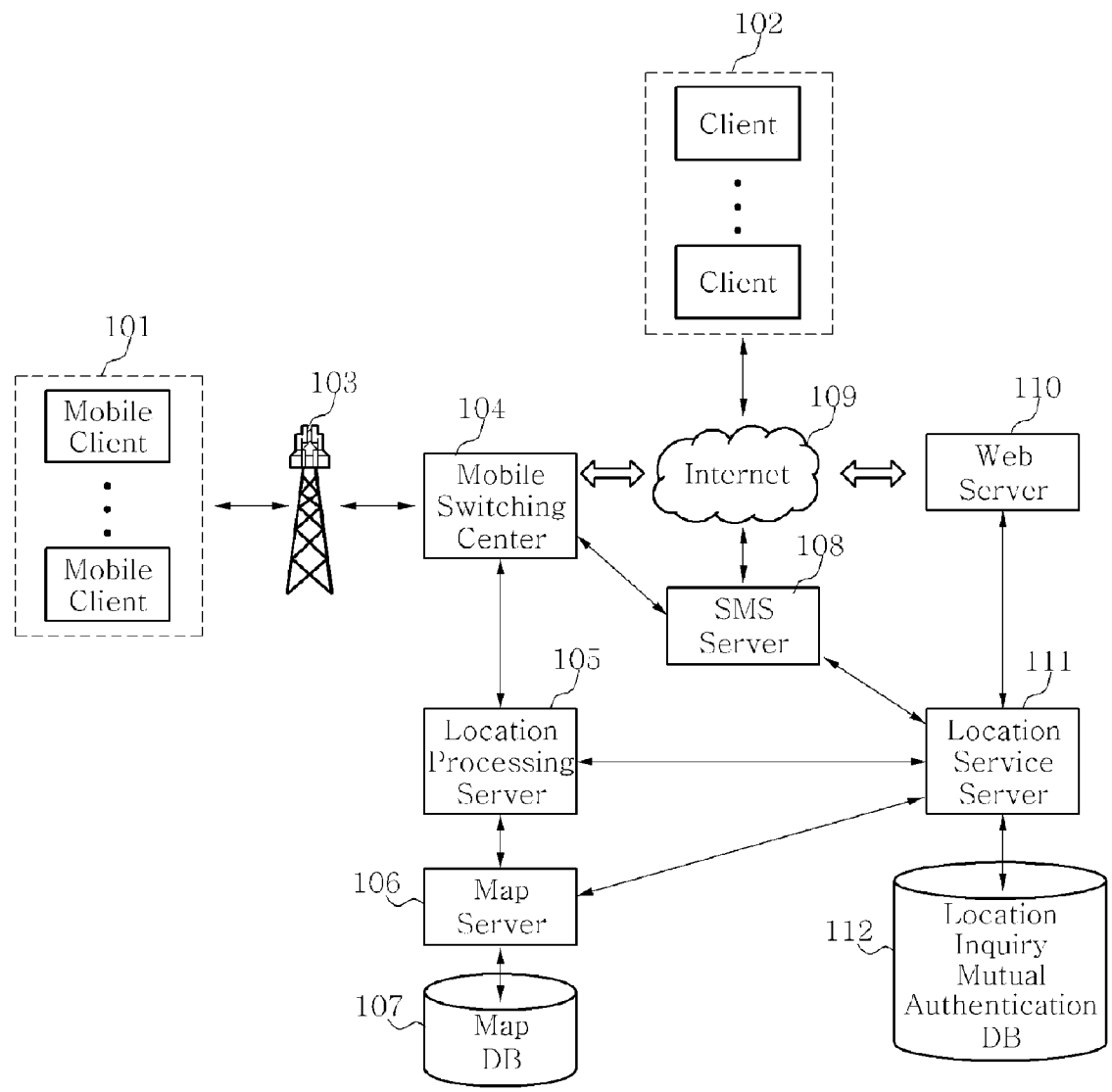
FIG. 1 is a block diagram showing a configuration of a conventional location-based service system.

Hereinafter, preferred embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 2:
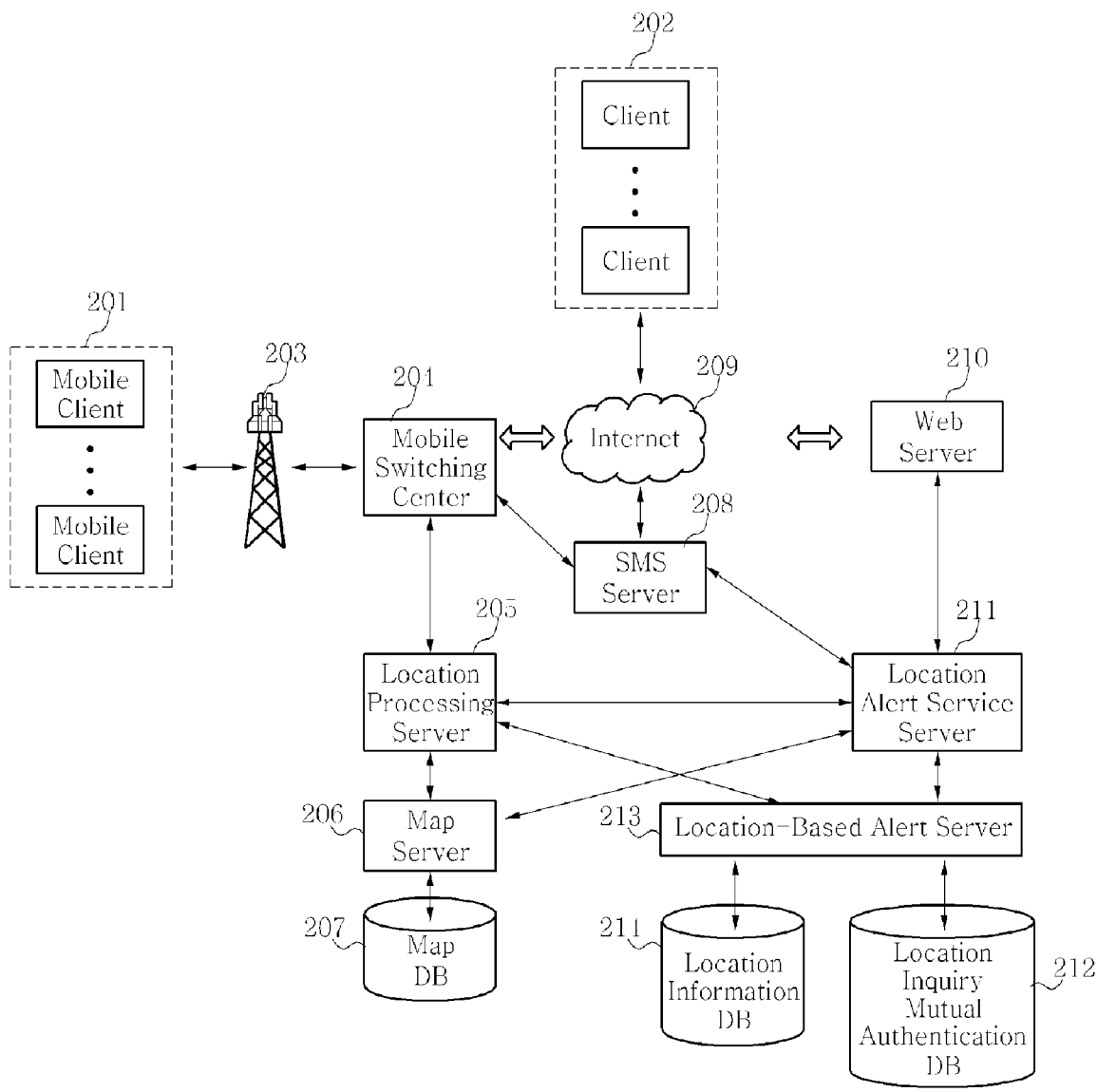
FIG. 2 is a block diagram of a location-based alert service system according to a preferred embodiment of the present invention.

FIG. 2 is a block diagram of a location-based alert service system according to a preferred embodiment of the present invention.

The location-based alert service system, according to the preferred embodiment of the present invention, includes a mobile client group 201 having a plurality of mobile clients, a client group 202 having a plurality of clients, a base station 203, a mobile switching center 204, a location processing server 205, a map server 206, a map DB 207, an SMS server 208, the Internet 209, a web server 210, a location alert service server 211, a location-based alert server 213, a location information DB 214 and a location inquiry mutual authentication DB 212.

First, each of the clients in the client group 202 are system connectable to the Internet 209 using a modem, e.g., a dedicated line, an ADSL or the like. Each of the client may be connected to the location alert service server 211 through the Internet 209 and the web server 210 to receive location alert services provided using the Internet 209.

Further, each of the mobile clients in the mobile client group 201 are wireless communication means, i.e., wireless portable terminals (e.g., a cellular phone, a PCS phone, a PDA, an IMT-2000 or the like), which are connectable to the Internet 109 through the mobile switching center 204 or the like. Similarly to each of the aforementioned clients, each of the mobile clients may be connected to the location alert service server 211 through the Internet 209 and the web server 210 to receive location based services provided using the Internet 209. Furthermore, the mobile client may be linked with the location alert service server 211 through the base station 203, the mobile switching center 204 or the like to use location information services with the wireless portable terminal through the SMS server 208.

Meanwhile, the base station 203 provides communication services between the mobile client within its own coverage (i.e., a cell) and the mobile switching center 204. The mobile switching center 204 includes base station controllers which oversee a plurality of base stations, a WAP gateway, a Home Location Register (HLR), a Visitor Location Register (VLR) and the like. The mobile switching center 204 provides various communication services performed between each of the mobile clients within the coverage of each base station which is under the control of the mobile switching center 204 and a counterpart client (or a mobile client), manages a local registration state of the mobile clients within the coverage of each base station which is under the control of the mobile switching center 204, and connects itself to the Internet 209 through the WAP gateway to provide location information services to each of the mobile clients.

Further, when there is a location detection request for a specific mobile client (i.e., a client that is a location information object of the location inquiry services) from the location processing server 205 in the mobile switching center 204, the mobile switching center 204 refers to the Home Location Register (HLR) and the Visitor Location Register (VLR) and searches a base station which currently covers and serves the mobile client of interest. If a base station within which the corresponding mobile client exists is founded, the mobile switching center 204 provides the location value of the corresponding base station for the location processing server 205. Furthermore, if the specific mobile client, which is an object of which location is inquired, is a terminal having a GPS module therein, the mobile client receives location information from a GPS satellite to provide the location value of the calculated result of the location information for the location processing server 205.

When there is a location detection request for the specific mobile client, as a device for determining location information for a mobile client, there are BSC (Base Base station Controller), MSC (Mobile Switching Center), HLR (Home Location Register), VLR (Visitor Location Register), GML (Gateway Mobile Location Center), SMLC (Service Mobile Location Center), MPC (Mobile Positioning Center), PDE (Position Determining Entity) and the like.

The web server 210 provides location information services to each of the clients or each of the mobile clients. When a client or a mobile client is connected through the Internet 209 to request the location information services, the web server 210 links between the corresponding client (or the mobile client) and the location alert service server 211 to provide the location information services corresponding thereto through various kinds of menu screens (e.g., an initial menu screen, a location alert menu screen, a location generation condition setting screen and the like).

A user using alert services implements a variety of settings for receiving the alert services through the location alert service server 211 of FIG. 2. As such settings, there is an alert zone setting for setting that, in a case where the user is located in a certain zone or has left from a certain zone, a corresponding movement will be informed; user management for selecting which user the alert services are provided for; a setting for various additional items such as a location permission request for permitting the location of such a user and a time setting for receiving the alert services; and the like.

Further, the location alert service server 211 registers and manages information related virtually to location information services put in or selected by a user, such as a setting of a location alert generation condition, a location alert service request, a location permission or the like, which are requested by each of the users (i.e., the client or the mobile client). The location alert service server 211 stores (registers) the result of mutual authentication for the location information services in the location inquiry mutual authentication DB 212 to manage it.

The location-based alert server 213 performs processing when a location inquiry request of an object mobile communication terminal is accomplished with respect to a condition for providing the location alert services set by the user through a link with the location alert service server 211. The number of location inquiries is minimized using a moving distance ratio, a moving direction and a Minimum Bounding Rectangle (hereinafter, referred to as "MBR") with respect to such alert service settings. Further, location information obtained as the result is stored in the location information DB 214, and used to dynamically configure the calculation of the moving distance ratio and the MBR hereafter.

Meanwhile, if address and/or mutual information are entered together with a location data request signal from the location alert service server 211 when the location alert services are provided, the map server 206 searches the map DB 207 in which electronic map data is built and stored in order to detect a location value (i.e., a coordinate value) for a requested address and/or mutual information on an electronic map, and to transmit the detected coordinate value as location data to the location alert service server 211. If the location value (i.e., the coordination value) is entered together with the map data request signal from the location alert service server 211 when the location alert generation services are provided, the map server 206 fetched a map data corresponding to the received location value from the map DB 207 to transmit it to the location alert service server 211.

Further, if a mobile client selects its own current location as a registration location when the location alert service is provided, the map server 206 transmits identification information on the corresponding mobile client together with a location data request signal, e.g. identification information on the corresponding mobile client together with a corresponding location search request signal, from the location alert service server 211. If the location value (i.e., the longitude and latitude coordinate values) of a base station in which the corresponding mobile client is served is provided from the location alert service server 211 through the location processing server 205 in response to the identification information on the corresponding mobile client, the map server 206 searches and reads a coordinate value corresponding to the location value of the corresponding base station from the map DB 207 so as to transmit it to the location alert service server 211.

In order to provide the location-based alert service, continuous location inquiries are required until the user of the object mobile communication terminal is located in a set alert region. As a method that can be easily considered, a location request for the object mobile communication terminal may be accomplished at a certain time interval. However, it causes generation of a large number of location requests to perform the location request for a large number of users at a certain time interval. Accordingly, the present invention has an advantage in that it is suitable to perform alert services at an uncertain time interval, and the number of location inquires can be minimized.

Figure 3:
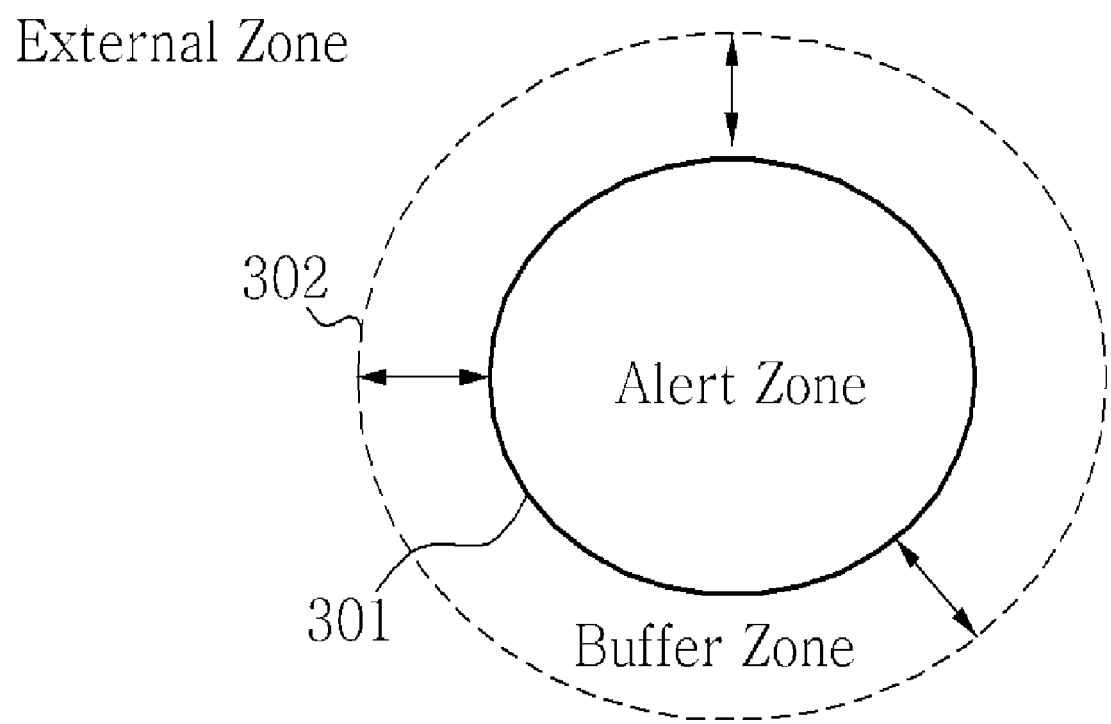
FIG. 3 is a view showing an example of production of an alert zone and a buffer zone with respect thereto according to the preferred embodiment of the present invention.

FIG. 3 is a view showing an example of production of an alert zone and a buffer zone with respect thereto according to the preferred embodiment of the present invention.

As shown in FIG. 3, there is generated the buffer zone 302 corresponding to an arbitrary distance with respect to the alert zone 301. If an object mobile communication terminal moves into or out of the alert zone 301, there is generated an alert for informing a user of this movement. Before such a condition is met, any mobile communication terminal should pass through the buffer zone 302 to move into or out of the alert zone 301. Before the object mobile communication terminal moves into the buffer zone 302, there is an increase/decrease of a time interval $\Delta t$ for requesting the next location according to the preferred embodiment of the present invention. However, if the object mobile communication terminal moves into the buffer zone 302, the time interval $\Delta t$ for requesting the next time location is set as $T_{init}$, which is an initial location inquiry time interval. This guarantees chances that the object mobile communication terminal can move from the buffer zone 302 to the alert zone 301 or from the buffer zone 302 to the external zone after time of minimum $T_{init}$. The buffer zone 302 may be applied to both methods for increasing/decreasing a time interval $\Delta t$ for requesting the next location based on a moving distance ratio of a mobile communication terminal user and the previous and current distances between the mobile communication terminal user and the center point of the alert zone 301, and for increasing/decreasing a time interval $\Delta t$ for requesting the next location by dynamically configuring an MBR with respect to a moving location of the mobile communication terminal user. Further, the buffer zone 302 may be flexibly modified depending on a $T_{init}$ value.

Figure 4:
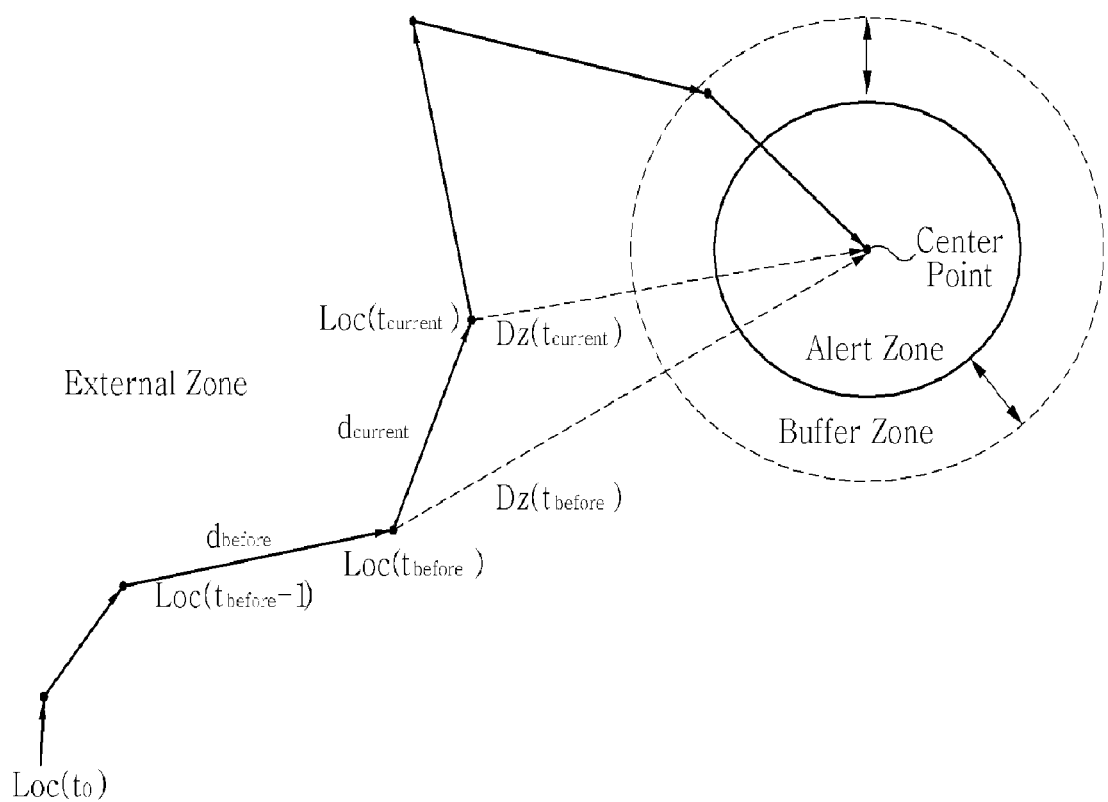
FIG. 4 is a view showing an example of a location and a moving distance when a user of a mobile communication terminal moves toward an alert zone from an external zone according to the preferred embodiment of the present invention.
Figure 5:
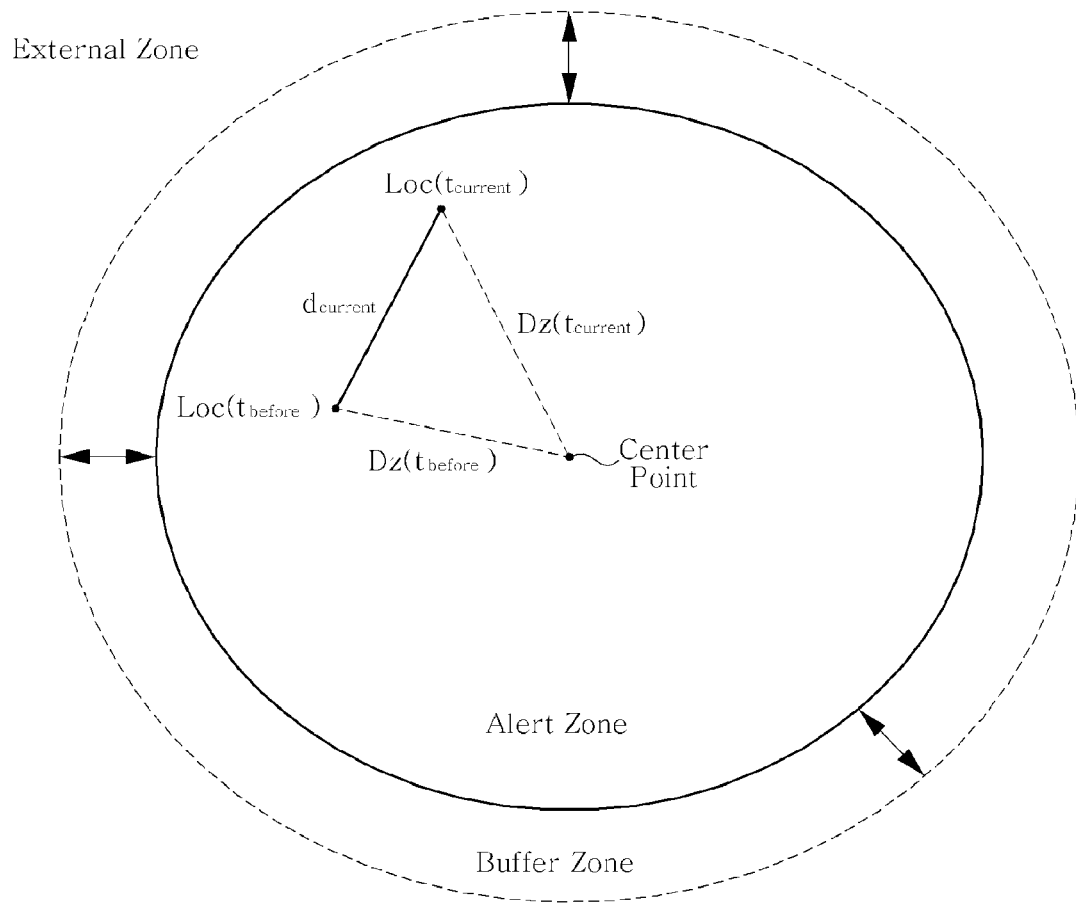
FIG. 5 is a view showing an example of a location and a moving distance when the user of the mobile communication terminal moves toward the external zone from the alert zone according to the preferred embodiment of the present invention.

FIG. 4 is a view showing an example of a location and a moving distance when a user of a mobile communication terminal moves toward an alert zone from an external zone according to the preferred embodiment of the present invention, and FIG. 5 is a view showing an example of a location and a moving distance when the user of the mobile communication terminal moves toward the external zone from the alert zone according to the preferred embodiment of the present invention.

FIGS. 4 and 5 are examples of a method for increasing/decreasing a time interval $\Delta t$ for requesting the next location depending on a ratio of the previous current moving distances and the previous and current distances between the user and the center point of the alert zone 301 so as to minimize the number of location requests. $d_{current}$ is defined as a moving distance between $Loc(t_{current})$ and $Loc(t_{before})$.

Factors and data structures used in the preferred embodiment of the present invention are defined and processed as follows:

(i) $d_{current}$ is a moving distance between location $Loc(t_{current})$ of the current time ($t_{current}$) and location $Loc(t_{before})$ of the previous location inquiry time ($t_{before}$).

(ii) $d_{before}$ is a moving distance between location $Loc(t_{before})$ of the previous location inquiry time ($t_{before}$) and location $Loc(t_{before-1})$ of the location inquiry time ($t_{before-1}$) just before the previous location inquiry time ($t_{before}$).

(iii) $\Delta t$ is a time interval for requesting the next location, in which after a location request has been made at time point $t_{current}$ that is the current time, the next location request is made at time point $t_{current}+\Delta t$. $\Delta t$ has a time range value of $[T_{min}, T_{max}]$, $T_{min}$ is the minimum time interval for requesting the next location, and $T_{max}$ is the maximum time interval until the next location request is made.

(iv) $\alpha$ that is a moving distance ratio of the current time ($t_{current}$) and the previous time ($t_{before}$) is defined as $d_{current}/d_{before}$. This represents how far the current moving distance is as compared with the previous moving distance.

(v) $D_{min}$ is the minimum moving distance at which it can be regarded that there is hardly a movement, and $D_{max}$ is the maximum moving distance at which it can be regarded that the range of a moving distance is considerably broad.

(vi) $D_z(t_{before})$ is a distance between $Loc(t_{before})$ and the center point of the alert zone 301, and $D_z(t_{current})$ is a distance between $Loc(t_{current})$ and the center point of the alert zone 301.

Figure 6:
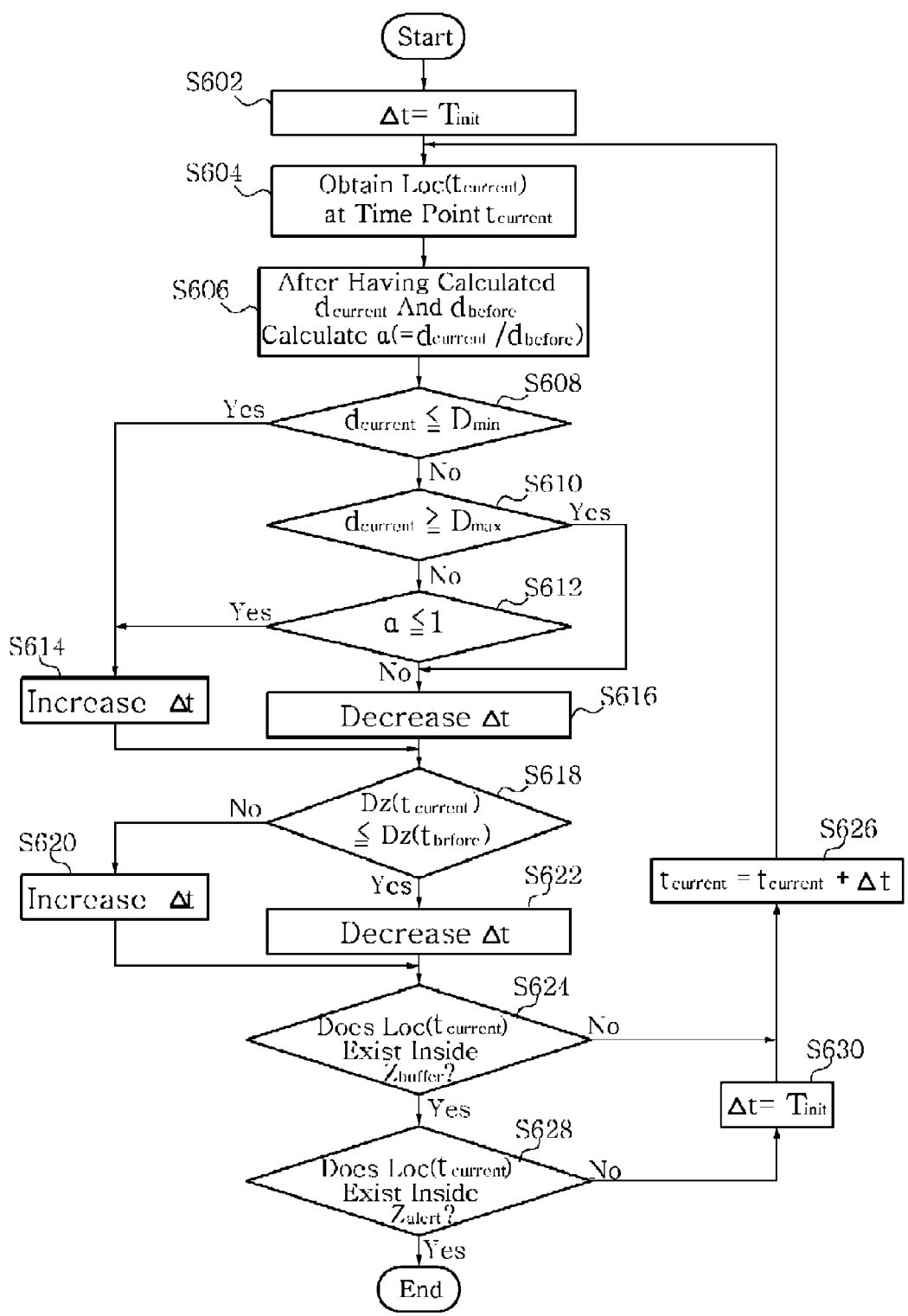
FIG. 6 is a flowchart illustrating a process of minimizing the number of location requests in accordance with an increasing/decreasing method of a time interval $\Delta t$ for requesting the next location through the ratio of a moving distance when an object mobile communication terminal moves toward the alert zone from the external zone according to the preferred embodiment of the present invention.

FIG. 6 is a flowchart illustrating a process of minimizing the number of location requests in accordance with an increasing/decreasing method of a time interval $\Delta t$ for requesting the next location through the ratio of a moving distance when a object mobile communication terminal moves toward the alert zone from the external zone according to the preferred embodiment of the present invention.

FIG. 6 illustrates a processing flow for minimizing the number of location requests by increasing/decreasing a time interval $\Delta t$ for requesting the next location depending on a ratio of the previous and current distances of the user and the previous and current distances between the user and the center point of the alert zone 301. The processing procedure is as follows.

According to the preferred embodiment of the present invention, the location-based alert server 213 sets initial $\Delta t$ as $T_{init}$, which is an initial location inquiry time interval (S602), and performs a location request at time point $t_{current}$ to obtain $Loc(t_{current})$ (S604).

The location-based alert server 213 calculates moving distance $d_{current}$ at the current time point and moving distance $d_{before}$ at the just previous time point to calculate ratio $\alpha(=d_{current}/d_{before})$ of the current moving distance with respect to the previous moving distance (S606).

According to the preferred embodiment of the present invention, the location-based alert server 213 compares $d_{current}$ with $D_{min}$ and $D_{max}$ to perform an increase or decrease of $\Delta t$. Further, the location-based alert server 213 compares distance $D_z(t_{before})$ between $Loc(t_{before})$ and the center point of the alert zone 301 with distance $D_z(t_{current})$ between $Loc(t_{current})$ and the center point of the alert zone 301 so as to perform an increase or decrease of $\Delta t$.

In a case where $d_{current}$ is smaller than or equal to $D_{min}$ by comparing $d_{current}$ with $D_{min}$ (S608), the location-based alert server 213 increases $\Delta t$ (S614). This means that, since the current moving distance is sufficiently small, time until the next location request is performed is possible to be longer.

In a case where $d_{current}$ is larger than or equal to $D_{max}$ (S610), the location-based alert server 213 decreases $\Delta t$ (S616). This means that, since it can be regarded that the current moving distance is sufficiently large (i.e., the movement is made at high speed), the object mobile communication terminal can reach the alert zone 301 at time shorter than before. Therefore, the location-based alert server 213 decreases a time interval for requesting the next location.

In a case where $d_{current}$ is larger than $D_{min}$ and smaller than $D_{max}$ ($D_{min}<d_{current}<D_{max}$), and $\alpha$ is smaller than or equal to 1 (S612), the location-based alert server 213 increases $\Delta t$ (S614). This means that the object mobile communication terminal currently moves a little as compared with the previous moving distance, and it takes a good time to reach the alert zone 301. Therefore, the location-based alert server 213 increases $\Delta t$ to decrease the number of location requests.

Further, in a case where $d_{current}$ is larger than $D_{min}$ and smaller than $D_{max}$ ($D_{min}<d_{current}<D_{max}$), and $\alpha$ is lager than 1, the location-based alert server 213 decreases $\Delta t$ (S616). Since the object mobile communication terminal currently moves more as compared with the previous moving distance, the location-based alert server 213 decreases $\Delta t$.

In a case where $D_z(t_{current})$ is smaller than or equal to $D_z(t_{before})$ by comparing $D_z(t_{before})$, which is a distance between $Loc(t_{before})$ and the center point of the alert zone 301, with $D_z(t_{current})$, which is a distance between $Loc(t_{current})$ and the center point of the alert zone 301 (S618), the location-based alert server 213 decreases $\Delta t$ (S622), and in a case where $D_z(t_{current})$ is larger than $D_z(t_{before})$, the location-based alert server 213 increases $\Delta t$ (S620). This means that, since the moving direction of the mobile communication terminal nears the alert zone 301 in a case where $D_z(t_{current})$ is smaller than or equal to $D_z(t_{before})$, the location-based alert server 213 decreases $\Delta t$, and since the moving direction of the mobile communication terminal moves away from the alert zone 301 in a case where $D_z(t_{current})$ is larger than $D_z(t_{before})$, the location-based alert server 213 increases $\Delta t$.

After the steps up to step S618 have been completed, the location-based alert server 213 determines whether the mobile communication terminal has entered the buffer zone 302 defined in FIG. 3 (S624). In a case where the mobile communication terminal has not entered the buffer zone 302, the location-based alert server 213 adds $\Delta t$ to $t_{current}$ (S626) so as to return to step S604.

If the mobile communication terminal has entered the buffer zone 302 defined in FIG. 3, the location-based alert server 213 determines whether the mobile communication terminal has entered the alert zone 301 (S628). Then, if the mobile communication terminal has not yet entered the alert zone 301 although it has entered the buffer zone 302, the location-based alert server 213 resets $\Delta t$ as $T_{init}$ (S630). That is, there is a possibility that the mobile communication terminal user will enter the alert zone 301 after time $T_{init}$. If the mobile communication terminal has already entered the alert zone 301 while being in the buffer zone 302, the location-based alert server 213 informs the user that the mobile communication terminal is located in the alert zone 301 so that the alert services ends.

Figure 7:
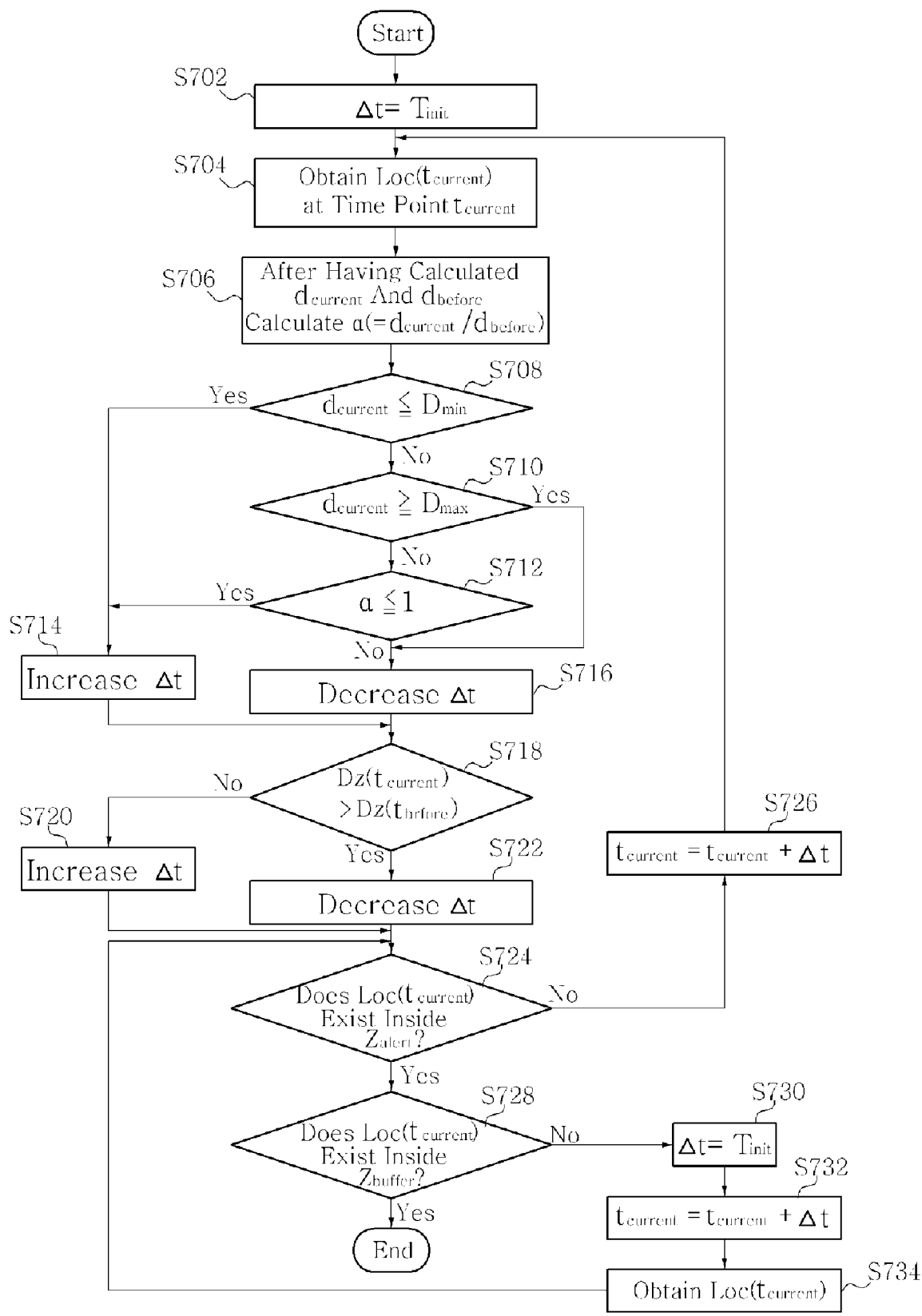
FIG. 7 is a flowchart illustrating a process of minimizing the number of location requests in accordance with an increasing/decreasing method of a time interval $\Delta t$ for requesting the next location through the ratio of a moving distance when the object mobile communication terminal moves toward the external zone from the alert zone according to the preferred embodiment of the present invention.

FIG. 7 is a flowchart illustrating a process of minimizing the number of location requests in accordance with an increasing/decreasing method of a time interval $\Delta t$ for requesting the next location through the ratio of a moving distance when the object mobile communication terminal moves toward the external zone from the alert zone according to the preferred embodiment of the present invention.

Similarly to FIG. 6, FIG. 7 illustrates a processing flow for minimizing the number of location requests by increasing/decreasing a time interval Δt for requesting the next location depending on a ratio of the previous and current distances and the previous and current distances between the user and the center point of the alert zone 301. The processing procedure is as follows:

According to the preferred embodiment of the present invention, the location-based alert server 213 sets initial Δt as Tint, which is an initial location inquiry time interval (S702), and performs a location request at time point $t_{current}$ to obtain $Loc(t_{current})$ (S704).

The location-based alert server 213 calculates moving distance $d_{current}$ at the current time point and moving distance $d_{before}$ at the just previous time point to calculate ratio $\alpha(=d_{current}/d_{before})$ of the current moving distance with respect to the previous moving distance (S706).

According to the preferred embodiment of the present invention, the location-based alert server 213 compares $d_{current}$ with $D_{min}$ and $D_{max}$ to perform an increase or decrease of Δt. Further, the location-based alert server 213 compares distance $D_z(t_{before})$ between $Loc(t_{before})$ and the center point of the alert zone 301 with distance $D_z(t_{current})$ between Loc ($t_{current}$) and the center point of the alert zone 301 so as to perform an increase or decrease of Δt.

In a case where $d_{current}$ is smaller than or equal to $D_{min}$ by comparing $d_{current}$ with $D_{min}$ (S708), the location-based alert server 213 increases Δt (S714). This means that, since the current moving distance is sufficiently small, it is possible to extend the time until the next location request is performed.

In a case where $d_{current}$ is larger than or equal to $D_{max}$ (S710), the location-based alert server 213 decreases Δt (S716). This means that, since it can be regarded that the current moving distance is sufficiently large (i.e., the movement is made in a faster speed), the object mobile communication terminal can reach the external zone at time shorter than before. Therefore, the location-based alert server 213 decreases a time interval for requesting the next location.

In a case where $d_{current}$ is larger than $D_{min}$ and smaller than $D_{max}$ ($D_{min}<d_{current}<D_{max}$), and α is smaller than or equal to 1 (S712), the location-based alert server 213 increases Δt (S714). This means that the object mobile communication terminal currently moves a little as compared with the previous moving distance, and it takes sufficient time to reach the external zone as much. Therefore, the location-based alert server 213 increases Δt to decrease the number of location requests.

Further, in a case where $d_{current}$ is larger than $D_{min}$ and smaller than $D_{max}$ ($D_{min}<d_{current}<D_{max}$), and α is larger than 1, the location-based alert server 213 decreases Δt (S716). Since the object mobile communication terminal currently moves more as compared with the previous moving distance, the location-based alert server 213 decreases Δt.

In a case where $D_z(t_{current})$ is smaller than or equal to $D_z(t_{before})$ by comparing $D_z(t_{before})$, which is a distance between $Loc(t_{before})$ and the center point of the alert zone 301, with $D_z(t_{current})$, which is a distance between $Loc(t_{current})$ and the center point of the alert zone 301 (S718), the location-based alert server 213 increases Δt (S720), and in a case where $D_z(t_{current})$ is larger than $D_z(t_{before})$, the location-based alert server 213 decreases Δt (S722). This means that, since the moving direction of the mobile communication terminal gets near to the alert zone 301 in a case where $D_z(t_{current})$ is smaller than or equal to $D_z(t_{before})$, the location-based alert server 213 increases Δt, and since the moving direction of the mobile communication terminal get away from the alert zone 301 in a case where $D_z(t_{current})$ is larger than $D_z(t_{before})$, the location-based alert server 213 decreases Δt.

After the process up to step S618 has been completed, the location-based alert server 213 determines whether the mobile communication terminal has entered the alert zone 301 defined in FIG. 3 (S724). In a case where the mobile communication terminal exists in the alert zone 301, the location-based alert server 213 adds Δt to $t_{current}$ (S726) so as to return to step S704.

In a case where the mobile communication terminal does not exist in the alert zone 301, the location-based alert server 213 determines whether the mobile communication terminal exists in the buffer zone 302 (S728). Then, in a case where the mobile communication terminal exists in the buffer zone 302, the location-based alert server 213 resets Δt as $T_{init}$ (S730), and adds Δt to $t_{current}$ (S732). After having obtained Loc ($t_{current}$) (S734), the location-based alert server 213 again identifies whether the mobile communication terminal exists in the alert zone 301 (S724). That is, it is likely that the mobile communication terminal user located in the buffer zone 302 will leave the buffer zone 302 and then enter the external zone after time $T_{init}$. In a case where the mobile communication terminal user left the buffer zone 302 and then has already entered the external zone, the location-based alert server 213 informs the user that the mobile communication terminal has left the alert zone 301 so that the alert services are ended.

Figure 8:
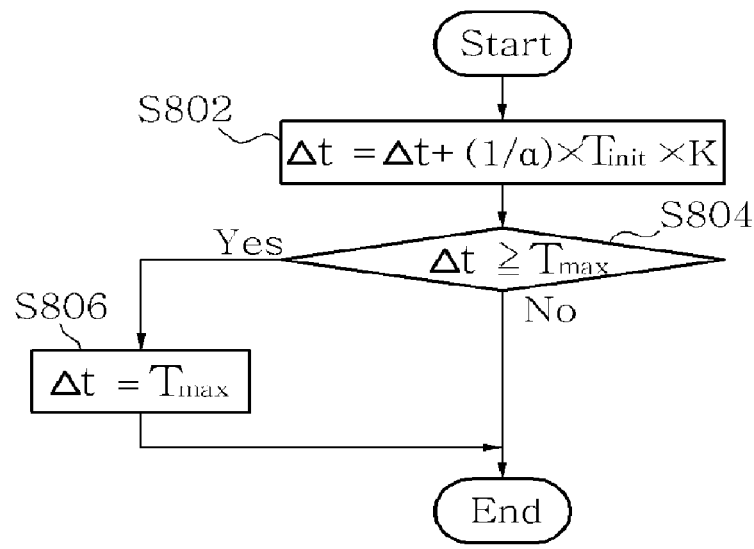
FIG. 8 is a first flowchart illustrating the increasing/decreasing method of a time interval $\Delta t$ for requesting the next location through the ratio of a moving distance according to the preferred embodiment of the present invention.
Figure 8:
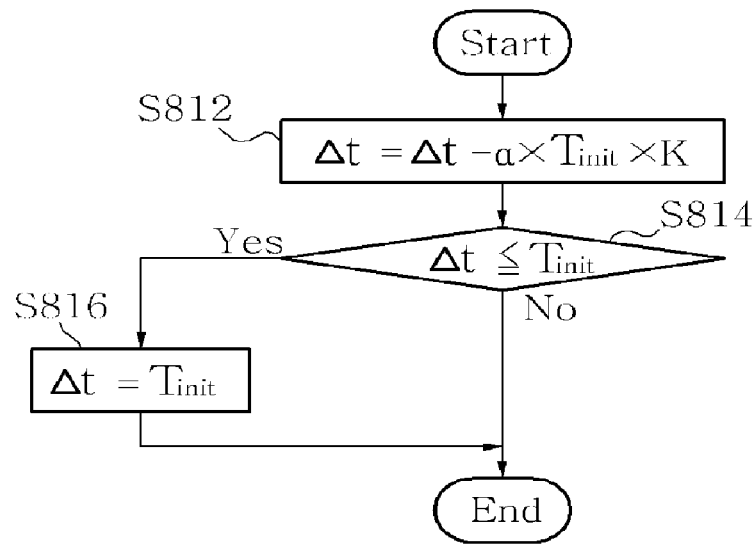
Figure 9:
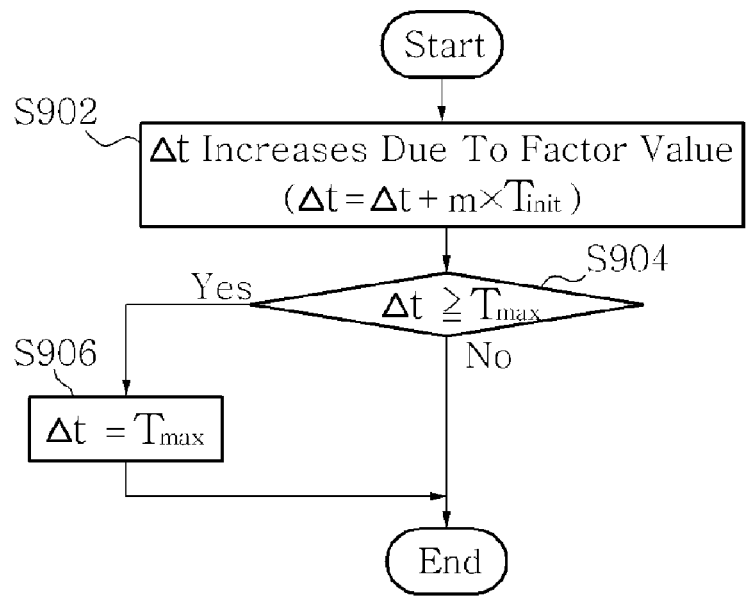
FIG. 9 is a second flowchart illustrating the increasing/decreasing method of a time interval $\Delta t$ for requesting the next location through the ratio of a moving distance according to the preferred embodiment of the present invention.
Figure 9:
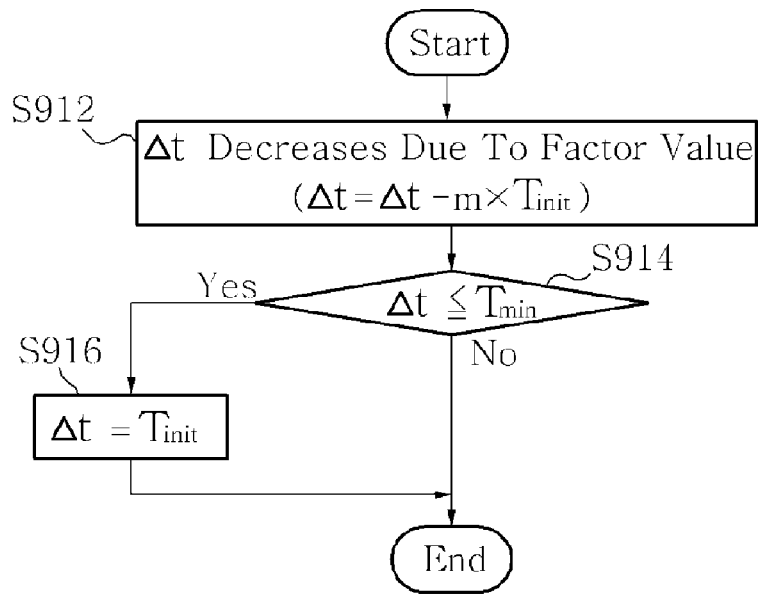

FIG. 8 is a first flowchart illustrating the increasing/decreasing method of a time interval Δt for requesting the next location through the ratio of a moving distance according to the preferred embodiment of the present invention, and FIG. 9 is a second flowchart illustrating the increasing/decreasing method of a time interval Δt for requesting the next location through the ratio of a moving distance according to the preferred embodiment of the present invention.

FIGS. 8 and 9 are embodiments illustrating how to increase/decrease Δt in the methods described in FIGS. 6 and 7.

(a) of FIG. 8 illustrates a method for increasing Δt. Δt increases by $1/\alpha \times T_{init} \times K$ using α calculated at steps S606 and S706 of FIGS. 6 and 7, $T_{init}$, adjusting coefficient K (S802). Adjusting coefficient K is a coefficient for adjusting a rapid increase or decrease of Δt. In a case where Δt becomes larger than $T_{max}$ to prevent the next location request time interval from being infinitely increased with respect to Δt increasing in such a manner (S804), the next location request is accomplished at $T_{max}$, which is the maximum limit value (S806). This secures that the mobile communication terminal does not enter the alert zone 301 before the next location request time interval.

(b) of FIG. 8 illustrates a method for decreasing Δt. Δt decreases by $\alpha \times T_{init} \times K$ using α calculated at steps S606 and S706 of FIGS. 6 and 7, $T_{init}$, and adjusting coefficient K (S812). Adjusting coefficient K is a coefficient for adjusting a rapid increase or decrease of Δt. In a case where Δt becomes smaller than $T_{min}$ to prevent the next location request time interval from being infinitely decreased with respect to Δt decreasing in such a manner (S814), the next location request is accomplished at $T_{init}$ (S816). This prevents many unnecessary location requests from being generated in a short time because Δt becomes smaller than $T_{min}$.

(a) and (b) of FIG. 9 illustrate another method for increasing/decreasing Δt. It is a main factor having considerable influence on performance of the location-based alert server for minimizing the number of location requests and the entire system how and how much Δt is increased/decreased. As a method that can be generally considered, there may be a method of increasing/decreasing Δt by a certain constant time of $T_{init}$ (S902, S912). For example, $\Delta t$ may be any one in $\Delta t \in \{\Delta t \times 1/n, \ldots, \Delta t \times \frac{1}{4}, \Delta t \times \frac{1}{3}, \Delta t \times \frac{1}{2}, \Delta t, \Delta t \times 2, \Delta t \times 3, \ldots, \Delta t \times n\}$. Further, as another possible method, there may be a method increasing/decreasing $\Delta t$ by $A^n$. For example, in a case where A is 2, $\Delta t$ may be any one in $\Delta t \in \{\Delta t \times 2^{-n}, \ldots, \Delta t \times 2^{-3}, \Delta t \times 2^{-2}, \Delta t \times 2^{-1}, \Delta t \times 2^0, \Delta t \times 2^1, \Delta t \times 2^2, \Delta t \times 2^3, \ldots, \Delta t \times 2^n\}$. If A is 3, $\Delta t \in \{\Delta t \times 3^{-n}, \ldots, \Delta t \times 3^{-3}, \Delta t \times 3^{-2}, \Delta t \times 3^{-1}, \Delta t \times 3^0, \Delta t \times 3^1, \Delta t \times 3^2, \Delta t \times 3^3, \ldots, \Delta t \times 3^n\}$. Which method is selected in such methods may be determined through various circumstances of the system, i.e., traffic and load of a communication network, location information processing permission capacity of the location processing server, the number of location-based alert service users and the like, and an appropriate method may be selected. Further, as described above, in a case where $\Delta t$ becomes larger than $T_{max}$ to prevent the next location request time interval from being infinitely increased with respect to $\Delta t$ (S904), the next location request is accomplished at $T_{max}$, which is the maximum limit value (S906). Furthermore, in a case where $\Delta t$ becomes smaller than $T_{min}$ to prevent the next location request time interval from being infinitely increased with respect to $\Delta t$ (S914), the next location request is accomplished at $T_{min}$ (S916).

In contrast to the method of increasing/decreasing a time interval for requesting the next location through a ratio of moving distances, there is a method of dynamically configuring an MBR for a moving location to minimize the number of location requests by increasing/decreasing a time interval for requesting the next location depending on a ratio of areas between the MBRs. In this method, the MBR for the current moving location and the MBR up to the location obtained at the previous time are dynamically configured such that they are used as a measure of how far the mobile communication terminal moves as a ratio of areas between the MBRs. If the MBR dynamically configured in such a manner is relatively larger than the previous MBR, this means that the mobile communication terminal moves that much. In this case, time interval $\Delta t$ for requesting the next location is increased.

Figure 10:
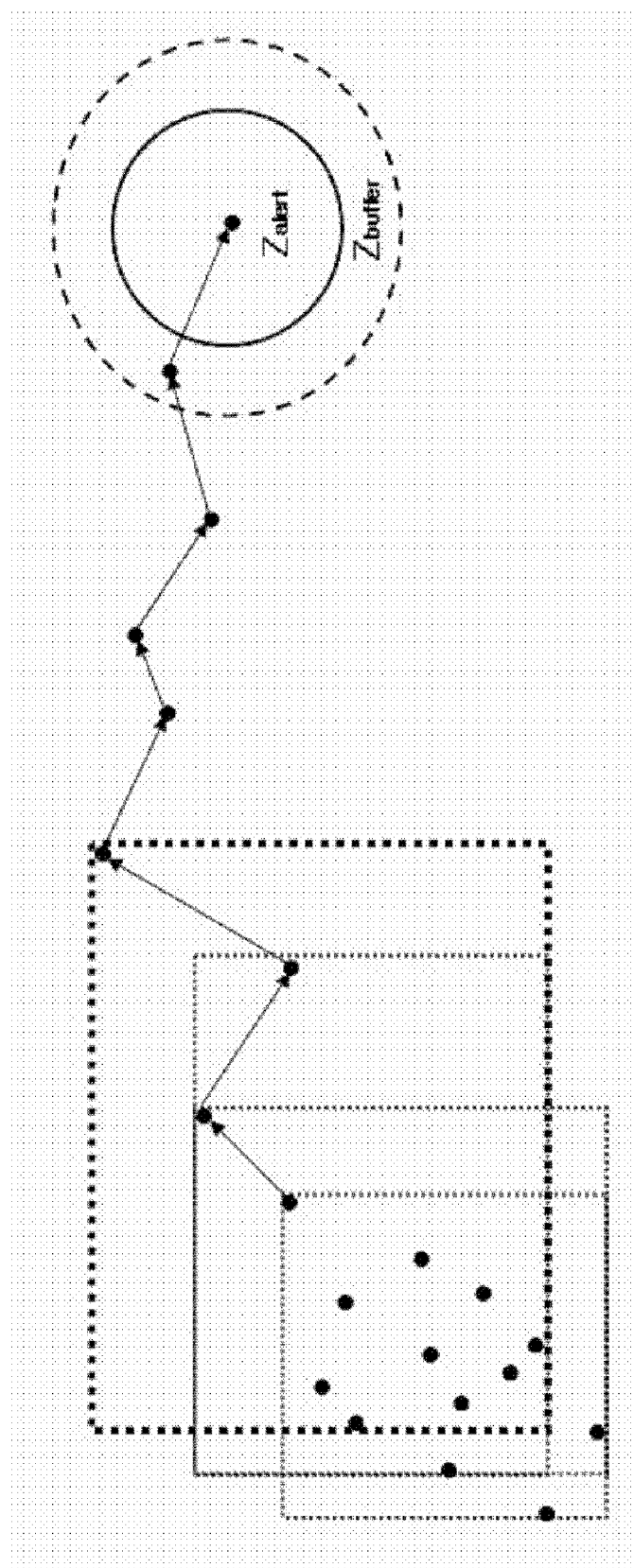
FIG. 10 is an exemplary view of a dynamic MBR configuration for a location and a moving location when the user of the mobile communication terminal moves towards the alert zone according to the preferred embodiment of the present invention.
Figure 11:
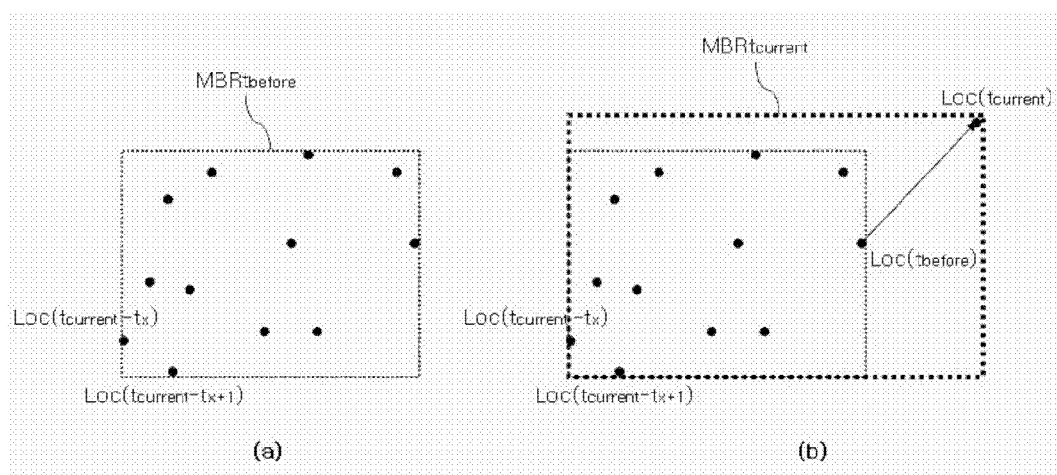
FIG. 11 is an exemplary view of a dynamic MBR configuration method for a moving location within a certain time range according to the preferred embodiment of the present invention.
Figure 12:
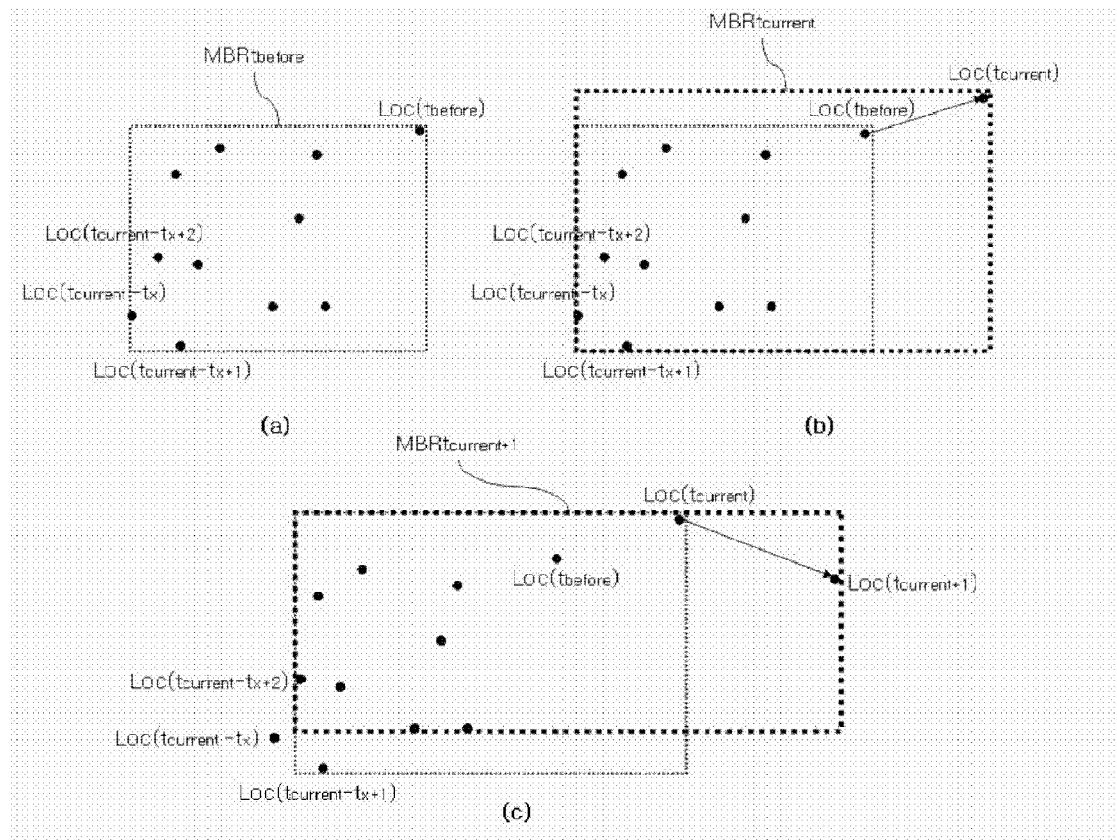
FIG. 12 is an exemplary view of a dynamic MBR configuration method for a moving location after a certain time range according to the preferred embodiment of the present invention.

FIG. 10 is an exemplary view of a dynamic MBR configuration for a location and a moving location when the user of the mobile communication terminal moves toward the alert zone according to the preferred embodiment of the present invention, FIG. 11 is an exemplary view of a dynamic MBR configuration method for a moving location within a certain time range according to the preferred embodiment of the present invention, and FIG. 12 is an exemplary view of a dynamic MBR configuration method for a moving location after a certain time range according to the preferred embodiment of the present invention.

FIG. 10 illustrates an example of increasing/decreasing $\Delta t$ until the mobile communication terminal user reaches the alert zone through an increase/decrease ratio of the MBR dynamically configured with respect to the location of an object mobile communication terminal.

In the application of this method, the MBR is continuously configured with respect to a moving location in the range of a certain time. Assuming that the certain time is $t_x$, whenever the acquisition of a new location is accomplished in the time range of $t_x$, an MBR containing the location is configured.

(a) of FIG. 11 illustrates $MBRt_{before}$ configured until the previous $Loc(t_{before})$ in the time range of $t_x$. (b) of FIG. 11 illustrates $MBRt_{current}$ containing not only $MBRt_{before}$, but also $Loc(t_{current})$ in the time range of $t_x$. This means that a moving pattern of any user can be formed for a certain period of time, and it may be regarded that the movement of the user within the formed pattern does not have influence on the possibility for user's moving up to the alert region. For example, a set time may be 24 hours, and in a case where any user moves for a day while attending/leaving work from Ilsan to Seoul, the MBR configures a usual moving pattern of the user. As such, the MBR in the certain time range is continuously maintained hereafter so that it can be determined that the user moves toward another zone when the user largely deviates the MBR.

There is produced an MBR not containing the location before the set time range, but containing the currently obtained location with respect to the location having obtained after time starting from the MBR configured for the certain period of time. There is produced a new $MBRt_{current}$ that contains location $Loc(t_{current})$ obtained at time $t_{current}$ in the previous $MBRt_{before}$, and excludes $Loc(t_{current}-t_x)$ obtained at time $t_{current}-t_x$ with respect to the location having obtained after time $t_{current}$ for $MBRt_{before}$, configured with the locations having obtained from $t_{current}-t_x$ to $t_{before}$ in (a) of FIG. 12, according to the preferred embodiment of the present invention. (b) and (c) of FIG. 12 are embodiments for this. In contrast to the MBR produced in the example of FIG. 11, the MBR configured after the certain time moves as time elapses, and the size of the MBR is increased/decreased.

Figure 13:
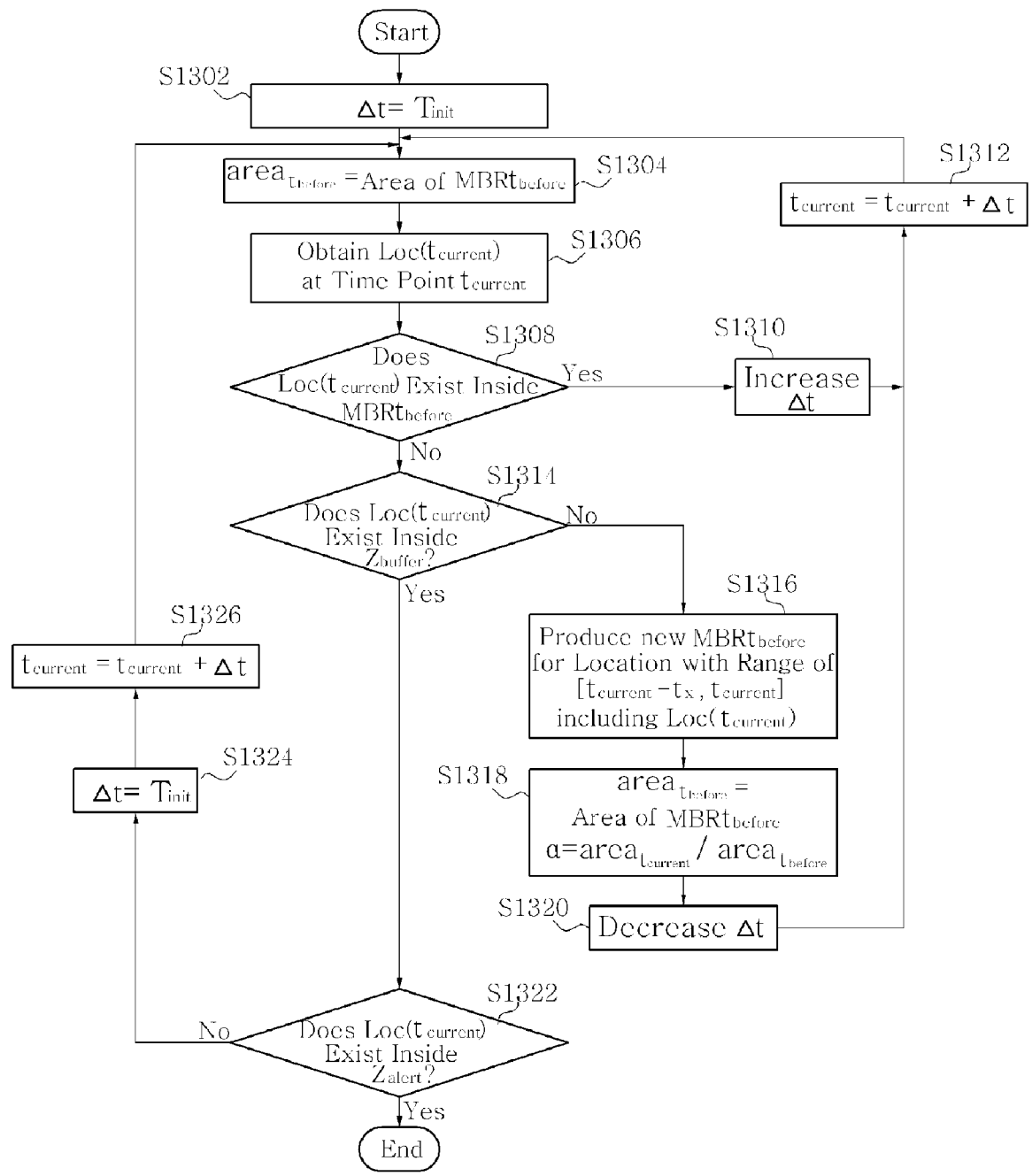
FIG. 13 is a flowchart illustrating a process of minimizing the number of location requests in accordance with an increasing/decreasing method of a time interval $\Delta t$ for requesting the next location through the dynamic MBR configuration method for a moving distance when the object mobile communication terminal moves toward the alert zone according to the preferred embodiment of the present invention.

FIG. 13 is a flowchart illustrating a process of minimizing the number of location requests in accordance with an increasing/decreasing method of a time interval $\Delta t$ for requesting the next location through the dynamic MBR configuration method for a moving distance when the object mobile communication terminal moves toward the alert zone according to the preferred embodiment of the present invention. The processing procedure is as follows.

An initial $\Delta t$ starts from $T_{init}$ (S1302), and $^{area}t_{before}$, which is the area of $MBRt_{before}$ dynamically configured until the previous time, is evaluated (S1304).

After $Loc(t_{current})$ has been obtained by performing a location request at time point $t_{current}$ (S1306), it is identified whether $Loc(t_{current})$ is located in $MBRt_{before}$ (S1308). If Loc $(t_{current})$ is located in $MBRt_{before}$, $\Delta t$ is increased while maintaining $MBRt_{before}$ as it is with no change (S1310). This means that the current movement existed in the current MBR, and there is no influence on the movement toward the alert zone.

Unless $Loc(t_{current})$ is located in $MBRt_{before}$ at step S1308, it is determined whether $Loc(t_{current})$ has entered the buffer zone 302 in the alert zone 301 (S1314).

Unless $Loc(t_{current})$ is located in the buffer zone 302 (i.e., unless $Loc(t_{current})$ reaches the buffer zone 302), there is produced a new $MBRt_{before}$ with respect to the location in time range $[t_{current}-t_x, t_{current}]$ containing $Loc(t_{current})$ (S1316).

In this case, since it can be sufficiently determined that the mobile communication terminal moves toward the alert zone 301 while forming a new MBR, $\Delta t$ is decreased so that the number of location requests is reduced.

$^{area}t_{current}$ the area of the newly configured $MBRt_{current}$ is evaluated, and $\alpha(^{area}t_{current}/^{area}t_{current})$, the ratio between the currently configured $MBRt_{current}$ and the previous MBR $t_{before}$ is evaluated (S1318).

$\Delta t$ is decreased using $\alpha$, which is a moving ratio between the MBRs (S1320).

If $Loc(t_{current})$ is located in the buffer zone 302 at step 1314, it is determined whether $Loc(t_{current})$ has already entered the alert zone 301 as the next step (S1322). Unless $Loc(t_{current})$ is located in the alert zone 301, $\Delta t$ is reset as $T_{init}$ (S1324). That is, it is likely that the mobile communication terminal user located in the buffer zone 302 will enter the alert zone 301 after time $T_{init}$. In a case where the mobile communication terminal user has already entered the alert zone 301 while being located in the buffer zone 302, the user is informed that the mobile communication terminal is located in the alert zone 301 so that the alert services are ended.

Figure 14:
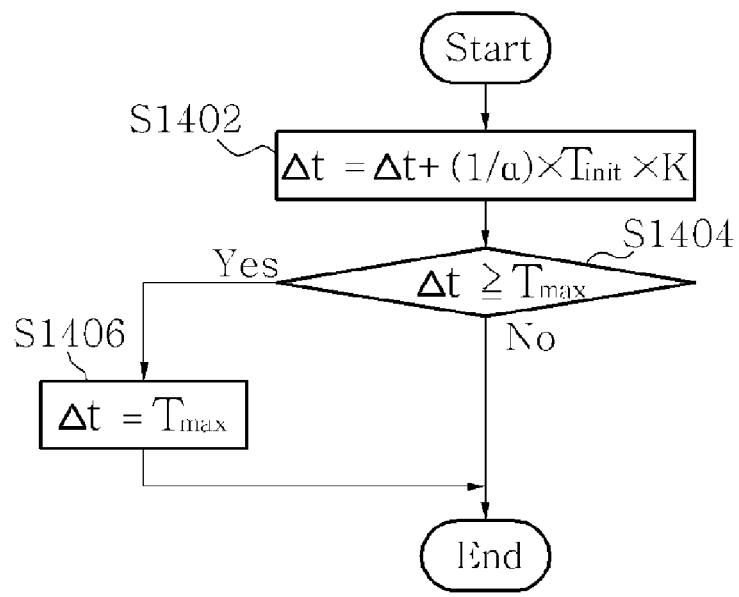
FIG. 14 is a flowchart illustrating the increasing/decreasing method of a time interval $\Delta t$ for requesting the next location through the dynamic MBR configuration according to the preferred embodiment of the present invention.
Figure 14:
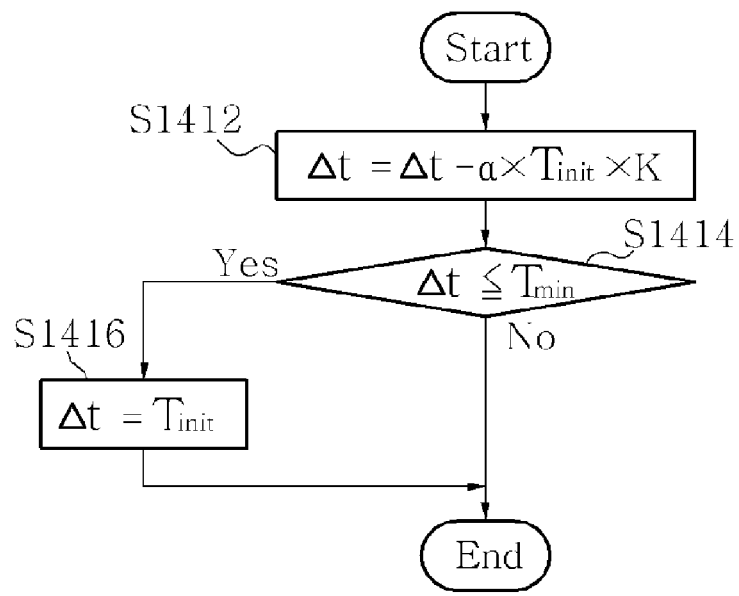

FIG. 14 is a flowchart illustrating the increasing/decreasing method of a time interval Δt for requesting the next location through the dynamic MBR configuration according to the preferred embodiment of the present invention.

FIG. 14 is an embodiment illustrating how to increase/decrease Δt until the object mobile communication terminal reaches the alert zone through an increase/decrease between the dynamically configured MBRs with respect to the location thereof, and how to increase/decrease Δt in a processing flow for minimizing the number of location requests, which is the aforementioned method.

(a) of FIG. 14 illustrates one method for increasing Δt. Δt increases by $1/\alpha \times T_{init} \times K$ using $\alpha$, $T_{init}$, and adjusting coefficient K (S1402). Adjusting coefficient K is a coefficient for adjusting a rapid increase or decrease of Δt. In a case where Δt becomes larger than $T_{max}$ to prevent the next location request time interval from being infinitely increased with respect to Δt increasing in such a manner (S1404), the next location request is accomplished at $T_{max}$, which is the maximum limit value (S1406). This secures that the mobile communication terminal does not enter the alert zone 301 before the next location request time interval.

(b) of FIG. 14 illustrates one method for decreasing Δt. Δt decreases by $\alpha \times T_{init} \times K$ using $\alpha$, $T_{init}$, and adjusting coefficient K (S1412). Adjusting coefficient K is a coefficient for adjusting a rapid increase or decrease of Δt. In a case where Δt becomes smaller than $T_{min}$ to prevent the next location request time interval from being infinitely decreased with respect to Δt decreasing in such a manner (S1414), the next location request is accomplished at $T_{init}$ (S1416). This prevents unnecessarily many location requests from being generated for a little time because becomes smaller than $T_{min}$.

As described above, according to the present invention, the number of location requests is minimized using methods of increasing/decreasing a time interval for requesting the next location depending on a moving distance ratio of a mobile communication terminal user and depending on a ratio between MBRs dynamically configured with respect to a moving location, so that a utilization degree and satisfaction of user services for a location-based alert service can be effectively met.

While the invention has been shown and described with reference to certain preferred embodiments thereof, it will be understood by those skilled in the art that various changes in form and details may be made therein without departing from the spirit and scope of the invention as defined by the appended claims.

What is claimed as new and desired to be protected by Letters Patent of the United States is:

1. A system for providing a location-based alert service to generate an alert upon monitoring a location of a mobile client relative to an alert zone, comprising:
   a client for inputting a location alert generation condition for using the location-based alert services;
   a location-based alert server for receiving location information on the mobile client to minimize the number of location inquiries using a moving distance ratio and a moving direction of the mobile client;
   a location information DB for receiving and storing the location information on the mobile client from the location-based alert server; and
   a location alert service server for receiving and storing the location alert generation condition from the client, and determining whether the mobile client exists in an alert range set by the client by receiving a location data of the mobile client from the location-based alert server to thereby generate an alert,
   wherein the location-based alert server increases or decreases a time interval for requesting the next location of the mobile client by comparing previous and current distances between the mobile client and the alert zone and determining a moving direction of the mobile client,
   wherein the location-based alert server generates a buffer zone corresponding to an arbitrary distance with respect to an alert zone, and sets the time interval for inquiring the next location of the mobile client as an initial location inquiry time interval if the mobile client enters the buffer zone,
   wherein the location-based alert server increases or decreases a time interval for requesting the next location with respect to a plurality of mobile communication terminals and the plurality of alert regions in a process of a method used by mixing methods for minimizing the number of location inquiries through the moving distance ratio of the mobile client and the previous and current distances between the mobile client and the certain zone, and through the increase/decrease ratio of areas between a Minimum Bounding Rectangle ("MBR") for the current moving location of the mobile client and the MBR up to the location having obtained at the previous time.

2. The system as claimed in claim 1, wherein the moving distance ratio is an index indicating how far the mobile client currently moves as compared with a previous moving distance, and the moving direction is calculated by the previous and current distances between the mobile client and the alert zone.

3. The system as claimed in claim 1, wherein the location-based alert server increases or decreases a time interval for requesting a next location with respect to a plurality of mobile communication terminals and a plurality of alert zones to thereby minimize the number of the location inquiries using the moving distance ratio of the mobile client and previous and current distances between the mobile client and the alert zone.

4. The system as claimed in claim 1, wherein the location-based alert server defines an upper limit and a lower limit of a time interval for requesting a next location of the mobile client, respectively defines the upper and lower limits as a maximum and minimum time intervals for requesting the next location, and increases or decreases a location request time interval in a range of the upper and lower limits.

5. The system as claimed in claim 1, wherein the location-based alert server defines an upper limit and a lower limit of a moving distance of the mobile client, respectively defines the upper and lower limits as a maximum moving distance, in which the width of the moving distance is a specific maximum value or more, and the minimum moving distance in which the width thereof is a specific minimum value or less, and increases or decreases a next location request time interval of the mobile client by determining whether the current moving distance is out of the range of the upper and lower limits.

6. The system as claimed in claim 1, wherein, in a case where the current moving distance of the mobile client is smaller than or equal to a lower limit value of the moving distance, the location-based alert server increases a time interval for inquiring a next location of the mobile client to reduce the number of location requests, and in a case where the current moving distance of the mobile client is larger than or equal to the upper limit value of the moving distance, the location-based alert server decreases a time interval for inquiring the next location of the mobile client.

7. The system as claimed in claim 1, wherein, in a case where a ratio of the current moving distance with respect to the previous moving distance is smaller than or equal to 1 while the current moving distance of the mobile client exists in the range of the upper and lower limits, the location-based alert server increases a time interval for inquiring the next location of the mobile client to reduce the number of location requests, and in a case where a ratio of the current moving distance with respect to the previous moving distance is larger than 1 while the current moving distance of the mobile client exists in the range of the upper and lower limits, the location-based alert server decreases a time interval for inquiring the next location of the mobile client.

8. The system as claimed in claim 1, wherein the location-based alert server increases or decreases a time interval for requesting the next location of the mobile client using a ratio between the previous and current distances of the mobile client, an initial location inquiry time interval of the mobile client, and a coefficient for adjusting a rapid increase/decrease of a time interval of requesting the next location thereof.

9. The system as claimed in claim 1, wherein, in a case where the mobile client enters or leave a alert zone to use the location-based alert service, the location alert service server performs the setting for an additional item containing at least one or more of an alert zone setting for setting an entering/leaving fact to be informed, user management for selecting whether alert services are provided with respect to the mobile client, a location permission request for permitting a location with respect to the mobile client, and a time setting for receiving the provided a location-based alert service.

10. A system for providing a location-based alert service to generate an alert upon monitoring a location of a mobile client relative to an alert zone, comprising:
   a client for inputting a location alert generation condition for using the location-based alert service;
   a location-based alert server for receiving location information on the mobile client to minimize the number of location inquiries using an increase/decrease ratio of areas between a Minimum Bounding Rectangle (hereinafter, referred to as "MBR") for a current moving location of the mobile client and the MBR up to the location of the mobile client, which has been obtained at a previous time;
   a location information DB for receiving and storing the location information on the mobile client from the location-based alert server; and
   a location alert service server for receiving and storing the location alert generation condition from the client, and determining whether the mobile client exists in an alert range set by the client by receiving a location data of the mobile client from the location-based alert server to thereby generate an alert,
   wherein the location-based alert server generates a buffer zone corresponding to an arbitrary distance with respect to an alert zone, and sets a time interval for inquiring the next location of the mobile client as an initial location inquiry time interval if the mobile client enters the buffer zone.

11. The system as claimed in claim 10, wherein the location-based alert server increases or decreases a time interval for requesting the next location with respect to a plurality of mobile communication terminals and the plurality of alert zones so as to minimize the number of location inquiries through an increase/decrease ratio of the areas between the MBR for the current moving location of the mobile client and the MBR up to the location having been obtained at the previous time.

12. The system as claimed in claim 10, wherein the location-based alert server dynamically configures the MBR for the moving location of the mobile client in a certain time range, and dynamically produces the MBR containing the location of the mobile client, which is currently obtained, with respect to the location of the mobile client, which has been obtained after the certain time range.

13. The system as claimed in claim 12, wherein the location-based alert server dynamically configures and manages the MBR for location information using a binary search tree and a spatial index method.

14. The system as claimed in claim 10, wherein the location-based alert server increases/decreases a time interval for requesting the next location while modifying/maintaining the previously configured MBR by identifying whether the location of the mobile client, which is obtained at the current time, is located in the previously configured MBR so as to minimize the number of location inquiries.

15. The system as claimed in claim 10, wherein the location-based alert server calculates an area ratio between the MBR dynamically configured up to the previous moving location of the mobile client and the MBR dynamically configured up to the current moving location thereof.

16. The system as claimed in claim 10, wherein the location-based alert server increases or decreases a time interval for requesting the next location using a change ratio between the MBRs for the previous and current moving locations of the mobile client, an initial location inquiry time interval, and a coefficient for adjusting a rapid increase/decrease of a time interval of requesting the next location of the mobile client.

17. The system as claimed in claim 10, wherein the location-based alert server increases or decreases a time interval for requesting the next location with respect to a plurality of mobile communication terminals and the plurality of alert regions in a process of a method used by mixing methods for minimizing the number of location inquiries through the moving distance ratio of the mobile client and the previous and current distances between the mobile client and the certain zone, and through the increase/decrease ratio of areas between the MBR for the current moving location of the mobile client and the MBR up to the location having obtained at the previous time.

18. The system as claimed in claim 10, wherein, in a case where there is a location inquiry request for the mobile client, the location-based alert server provides the location value by retrieving a Home Location Register (HLR) and a Visitor Location Register (VLR) to retrieve what base station the mobile client currently enters, and in a case where the mobile client that becomes an object inquiring a location is a terminal having GPS built therein, the location-based alert server receives location information from a GPS satellite to link with a location processing server for providing the location value of the calculated result.

19. The system as claimed in claim 10, wherein the location-based alert server minimizes the number of location inquiries with respect to a condition for providing location alert services set by a user through the link with the location alert service server, and performs a process for when the location inquiry request of the mobile client is accomplished.

20. The system as claimed in claim 1, wherein, in a case where there is a location inquiry request for the mobile client, the location-based alert server provides the location value by retrieving a Home Location Register (HLR) and a Visitor Location Register (VLR) to retrieve what base station the mobile client currently enters, and in a case where the mobile client that becomes an object inquiring a location is a terminal having GPS built therein, the location-based alert server receives location information from a GPS satellite to link with a location processing server for providing the location value of the calculated result.

21. The system as claimed in claim 1, wherein the location-based alert server minimizes the number of location inquiries with respect to a condition for providing location alert services set by a user through the link with the location alert service server, and performs a process for when the location inquiry request of the mobile client is accomplished.

* * * * *